(12) United States Patent
Collins et al.

(10) Patent No.: US 10,087,049 B2
(45) Date of Patent: Oct. 2, 2018

(54) METHOD OF TESTING AN OPTICAL SENSOR

(71) Applicant: Ensota Limited, Swindon (GB)

(72) Inventors: Peter Collins, Swindon (GB); John Curzon, Swindon (GB)

(73) Assignee: Ensota Limited, Swindon (GB)

( * ) Notice: Subject to any disclaimer, the term of this patent is extended or adjusted under 35 U.S.C. 154(b) by 424 days.

(21) Appl. No.: 14/702,036

(22) Filed: May 1, 2015

(65) Prior Publication Data

US 2015/0316410 A1 Nov. 5, 2015

(30) Foreign Application Priority Data

May 2, 2014 (GB) .................................. 1407840.6

(51) Int. Cl.
*G01J 1/02* (2006.01)
*B66B 13/26* (2006.01)
(Continued)

(52) U.S. Cl.
CPC .............. *B66B 13/26* (2013.01); *E05F 15/73* (2015.01); *E05F 15/78* (2015.01); *G01J 1/0295* (2013.01);
(Continued)

(58) Field of Classification Search
CPC combination set(s) only.
See application file for complete search history.

(56) References Cited

U.S. PATENT DOCUMENTS 4,878,801 A * 11/1989 Pearson ............... H05K 13/022
221/210

5,214,271 A 5/1993 Rogers et al.
(Continued)

FOREIGN PATENT DOCUMENTS

GB 2227093 A 7/1990
JP 3177996 A 1/1991
(Continued)

OTHER PUBLICATIONS

Search Report issued by British Intellectual Property Office in related patent application No. GB1407840.6 dated Oct. 31, 2014 (4 pages).

*Primary Examiner* — Mamadou Diallo
(74) *Attorney, Agent, or Firm* — Gesmer Updegrove LLP

(57) ABSTRACT

There is disclosed a method of testing an optical door sensor 100 having an emitter 102 for emitting a light signal 104 and a receiver 106 for detecting the light signal 104, the optical door sensor 100 having at least one sensor operating parameter and further having a baseline state in which the receiver 102 can detect a light signal from the emitter 106. The method comprises setting the optical door sensor in an offset state 204, 304, in which a sensor operating parameter is offset from a baseline setting by an offset amount, the baseline setting corresponding to the baseline state of the optical door sensor; conducting a signal test 206 with the optical door sensor in the offset state; and generating an alert 216 when the signal test result is negative for the offset state and the offset amount is less than or equal to a limit margin. The signal test comprises: emitting a light signal from the emitter 208 and determining whether the light signal is detected by the receiver 210. The signal test has a positive result if the light signal is detected by the receiver and a negative result if the light signal is not detected by the receiver.

14 Claims, 8 Drawing Sheets

(51) Int. Cl.
*E05F 15/73* (2015.01)
*E05F 15/78* (2015.01)
*G01V 8/10* (2006.01)

(52) U.S. Cl.
CPC .......... *G01V 8/10* (2013.01); *E05Y 2400/458* (2013.01); *E05Y 2400/50* (2013.01); *E05Y 2900/104* (2013.01)

(56) References Cited

U.S. PATENT DOCUMENTS

| | | | | |
|---|---|---|---|---|
| 9,167,242 | B1* | 10/2015 | Meyer | G01R 35/00 |
| 2007/0090944 | A1* | 4/2007 | Du Breuil | G08B 25/009 |
| | | | | 340/531 |
| 2012/0181117 | A1* | 7/2012 | Chasteen | B66B 11/0233 |
| | | | | 187/392 |
| 2013/0056309 | A1* | 3/2013 | De Coi | B66B 13/22 |
| | | | | 187/316 |
| 2013/0146398 | A1* | 6/2013 | De Coi | B66B 5/0031 |
| | | | | 187/316 |
| 2013/0228400 | A1* | 9/2013 | Terry | B66B 1/3492 |
| | | | | 187/394 |
| 2016/0237713 | A1* | 8/2016 | Dezer | E04H 6/40 |

FOREIGN PATENT DOCUMENTS

| | | |
|---|---|---|
| JP | 11339159 | 10/1999 |
| JP | 20014761 A | 1/2001 |

\* cited by examiner

METHOD OF TESTING AN OPTICAL SENSOR

PRIORITY INFORMATION

The present invention claims priority to British Patent Application No. 1407840.6, filed on May 2, 2014, which is incorporated herein by reference in its entirety.

The invention relates to a method of testing an optical sensor, in particular an optical door sensor for an automatic door installation, such as an elevator installation.

A typical elevator installation has an elevator shaft in which there is a number of predetermined stops corresponding to the floors of a building, and an elevator car movable within the shaft. The elevator car typically has one or two doors, and the elevator shaft typically has a corresponding number of shaft doors at each stop.

Known elevator installations are provided with a number of sensors to ensure safe operation of the elevator installation, in particular the doors. An elevator car is typically provided with an optical door sensor for detecting the presence of an obstacle, such as a person or an object, in front of the elevator car doors. Known optical door sensors include break beam sensors that form a light curtain of infrared light outside of the elevator car doors (i.e. between the elevator car doors and the shaft doors when the elevator car is at a stop). The optical door sensors may have an array of emitters for emitting light signals, and an array of receivers for detecting the light signals. The optical door sensor typically determines that there may be an obstacle in front of the elevator car doors when an emitted light signal is not detected by a receiver.

The operation of such an elevator installation depends on whether the optical door sensor determines the presence of an obstacle or not. For example, confirmation that no obstacle is present is typically required before an elevator car can begin to move, and the elevator car doors may be prevented from closing if the optical door sensor determines that an obstacle is present. Accordingly, the optical door sensor can essentially cause the elevator installation to be taken out of service if it incorrectly determines that an obstacle is present, thereby preventing access to a building or other facility.

The performance of the optical door sensor may depend on the operating conditions of the automatic door installation. In a particularly dirty or dusty environment, material may build up on the optical door sensor that may partially or totally occlude light signals at the emitter and/or the receiver. A build-up of material may therefore prevent a light signal emitted by the emitter from being detected by the receiver, causing the optical door sensor to incorrectly determine that an obstacle is present, and thereby preventing the doors from closing and the elevator car from moving. Similarly, the performance of the optical sensor can be affected by electronic noise. For example, excessive electronic noise affecting the sensor may cause a receiver to fail to detect a light signal from the emitter (i.e. the receiver may fail to distinguish the light signal from the electronic noise). Other operating conditions that can affect sensor performance include the physical alignment of the emitter and receiver, and the condition of the components of the optical sensor itself, which can degrade over time.

A build-up of material on the optical door sensor or the deterioration of other operating conditions of the optical door sensor may therefore cause the automatic door installation to be temporarily taken out of service.

Whilst it may be possible to manually clean the optical door sensor to resume normal service, or take other corrective action to improve the operating conditions of the optical door sensor, this corrective action can be lengthy and/or expensive.

Further, the deterioration of the operating conditions of the optical door sensor is typically only detected once it has failed to function properly and the corresponding automatic door installation has been taken out of service, since an investigation as to the cause of failure may then be initiated.

It is therefore desirable to provide a method of testing an optical door sensor.

There is provided a method of testing an optical sensor comprising: simulating a deterioration of the operating conditions of the optical sensor and determining whether the optical sensor continues to function normally. An alert may be generated if it is determined that the optical sensor ceases to function normally. Deterioration of the operating conditions is relative to a baseline state of the optical sensor in which it functions normally (i.e. in which a light signal from the emitter can be detected by the receiver).

According to a first aspect of the invention there is provided a method of testing an optical door sensor having an emitter for emitting a light signal and a receiver for detecting the light signal, the optical door sensor having at least one sensor operating parameter and further having a baseline state in which the receiver can detect a light signal from the emitter, the method comprising: setting the optical door sensor in an offset state in which a sensor operating parameter is offset from a baseline setting by an offset amount, the baseline setting corresponding to the baseline state of the optical door sensor; conducting a signal test with the optical door sensor in the offset state comprising: emitting a light signal from the emitter; and determining whether the light signal is detected by the receiver, the signal test having a positive result if the light signal is detected by the receiver and a negative result if the light signal is not detected by the receiver; and generating an alert when the signal test result is negative for the offset state and the offset amount is less than or equal to a limit margin.

The method may be a method of testing an operating margin of the optical door sensor. An operating margin of the optical door sensor may relate to a level of deterioration of the operating conditions of the optical door sensor that can be sustained whilst the optical door sensor continues to function normally. An operating margin may relate to a respective sensor operating parameter. An operating margin may relate to the level of deterioration of an operating condition that can be sustained, and may be indicative of other operating margins and/or the overall tolerance of the optical door sensor to deterioration of its operating conditions.

The method allows it to be determined whether an operating margin of the optical door sensor is narrow (i.e. less than or equal to the limit margin), which would indicate that only minimal deterioration of the operating conditions can be sustained before the optical door sensor will cease to function normally. If it is determined that the operating margin is narrow, corrective action to improve the operating conditions may be taken.

The method may include conducting a signal test with the optical door sensor in the baseline state and confirming a positive result of the signal test for the baseline state, preferably before the optical door sensor is set in an offset state.

The offset state may be set to simulate deterioration of the operating conditions of the optical door sensor, in particular the environmental operating conditions. In other words, the offset state may be set to artificially reduce the operating envelope of the optical door sensor. The operating envelope of the optical door sensor comprises those sets of operating conditions of the optical door sensor in which, in the absence of an obstacle between the emitter and the receiver, the receiver can detect a light signal from the emitter. The operating envelope therefore represents the operating conditions of the optical door sensor under which the optical door sensor will function normally (i.e. is serviceable).

The operating conditions may include one or more environmental operating conditions of the optical door sensor (i.e. operating conditions that cannot be or are not controlled), such as the level of optical occlusion of the sensor by accumulated material (e.g. dirt or dust), the level of electronic noise that affects optical door sensor, and the alignment of the emitter and receiver.

The operating conditions may also include one or more of the sensor operating parameters of the optical door sensor, such as the light intensity of emitted light signals, the sensitivity (e.g. gain ratio or amplification) of the receiver and the level of electronic noise that affects the optical door sensor. The level of electronic noise can be both a sensor operating parameter, in that it can be artificially introduced, and also an environmental operating condition, in that it relates to the electronic environment of the sensor that cannot or is not subject to control. These and other parameters of the sensor may also deteriorate over time, for example, the sensitivity of the receiver may deteriorate over time.

The sensor operating parameters of the optical door sensor relate to operating conditions that can be controlled. For example, the light intensity of emitted light signals may be reduced below a baseline intensity corresponding to the normal operating conditions or baseline state of the optical door sensor. Further, the sensitivity of the receiver can be reduced, and/or a source of electronic noise can be introduced which affects the optical door sensor.

In the method, two or more sensor operating parameters may be offset from respective baseline settings in the offset state by respective offset amounts, and an alert may be generated when the corresponding signal test result is negative and each of the respective offset amounts is less than or equal to respective limit margins. The limit margins may each be predetermined. Accordingly, the method may simulate deterioration in two or more sensor operating parameters, and the compound effect may be evaluated by determining whether the optical door sensor continues to function normally.

The method may comprise successively setting the optical door sensor in a plurality of different offset states. A signal test may be conducted for each of the plurality of offset states. The different offset states can vary from one another by virtue of the sensor operating parameter that is set, and/or by the offset amount.

The plurality of offset states may comprise at least one offset state in which the sensor operating parameter is a first sensor operating parameter, such as light intensity, and at least one offset state in which the sensor operating parameter is a different second sensor operating parameter, such as receiver gain ratio. Each sensor operating parameter has a respective baseline setting corresponding to the baseline state of the optical door sensor.

The plurality of offset states may comprise at least one offset state in which a sensor operating parameter is offset by a first offset amount, and at least one offset state in which the same sensor operating parameter is offset by a different second offset amount. In other words, the offset amount for the same sensor operating parameter may vary between offset states. The optical door sensor may be set in at least three offset states having offset amounts which differ by a regular interval.

The sensor operating parameter may be progressively offset for a plurality of successive offset states. For example, the sensor operating parameter may be varied gradually to simulate deterioration of the operating conditions of the sensor. Signal tests may be conducted for successive offset states until a signal test has a negative result. Progressively offsetting a sensor operating parameter over a succession of offset states until a signal test has a negative result can allow the offset amount at which the optical door sensor ceases to functioning normally to be determined (i.e. an operating margin for the respective sensor operating parameter), at least approximately. Alternatively, the optical door sensor can be set in the various different offset states, and the corresponding signal tests conducted, in any order.

At least one of the plurality of offset states may be set on the basis of the signal test result for a preceding offset state. For example, offset states may be set to determine the offset amount at which the optical door sensor ceases to function normally based on the offset amounts and signal test results of previous offset states. For example, a bisection method may be used to determine the operating margin.

The method may comprise determining an operating margin of the optical door sensor. The operating margin may relate to the tolerance of the optical door sensor to deterioration of the operating conditions of the optical door sensor.

An operating margin of the optical door sensor may be determined based on a minimum offset amount for the sensor operating parameter that corresponds to a negative signal test result and/or a maximum offset amount for the sensor operating parameter corresponding to a positive signal test result. The maximum and minimum offset amounts may be selected from the offset states for which signal tests have been conducted.

The method may further comprise reporting the operating margin to a remote monitoring station. Alternatively or in addition, the operating margin may be determined and stored locally within the optical door sensor, in an automatic door installation in which the optical door sensor is installed, such as an elevator installation, or at a remote monitoring station.

The method may further comprise generating an alert when the operating margin is determined to be less than or equal to a limit margin. The alert may be generated locally in the optical door sensor, in an automatic door installation in which the optical door sensor is installed, such as an elevator installation, or at a remote monitoring station.

The sensor operating parameter that is offset from a baseline setting may relate to the light intensity of the light signal emitted by the emitter, the sensitivity of the receiver or the electronic noise intensity in the circuitry of the optical door sensor.

The optical door sensor may comprise a plurality of emitters and a plurality of receivers. The optical door sensor may be arranged so that each receiver can receive light signals from only one or from more than one emitter. The optical door sensor may be an optical door sensor for an automatic door installation, such as an elevator installation. The optical door sensor may be installed on an elevator car of an elevator installation.

The method may further comprise initiating a cleaning operation to clean the optical door sensor when an alert is generated.

According to an aspect of the invention there is provided a method of operating an automatic door installation comprising door sensor equipment including an optical door sensor, the automatic door installation being operable in at least a standard mode, in which the door sensor equipment conducts an obstacle check to determine whether an obstacle is present according to a first obstacle check procedure, and a contingency mode, in which the door sensor equipment conducts the obstacle check according to a different second obstacle check procedure, the method comprising: testing the optical door sensor in accordance with the first aspect of the invention; and operating the automatic door installation in the contingency mode when an alert is generated. In other words, the method comprises operating the automatic door installation in the contingency mode when the signal test result is negative for the offset state and the offset amount is less than or equal to a limit margin.

The second obstacle check procedure can differ from the first obstacle check procedure in a number of different ways that may increase the probability of the obstacle check correctly determining the presence or absence of an obstacle.

The first obstacle check procedure may comprise a predetermined set of steps having a predetermined set of properties, and the second obstacle check procedure may comprise a different set of steps and/or a different set of properties. The steps and/or properties of the second obstacle check procedure may be predetermined. The standard operating range may be predetermined.

The second obstacle check procedure may comprise repeating a step one or more times so that the respective step is performed more times in the contingency mode than in the standard mode. Accordingly an obstacle checking time corresponding to the time period for determining whether an obstacle is present may be greater in the contingency mode than in the standard mode.

A property of the obstacle check may differ between the first obstacle check procedure and the second obstacle check procedure, the property being selected from the group consisting of: the carrier frequency of the light signal; the light intensity of the light signal; a frequency-hopping property of the light signal; the time-period of the light signal; the data format of the light signal; and the phase of the light signal.

The optical door sensor may comprise a plurality of emitters for emitting light signals and a plurality of receivers for detecting the light signals, and the obstacle check may comprise determining whether light signals along a set of light paths between the emitters and receivers are detected by the receivers. In the first obstacle check procedure the set of light paths may consist of a plurality of light paths arranged in a first pattern, and in the second obstacle check procedure the set of light paths may consist of a plurality of light paths arranged in a different second pattern.

The second pattern may be variable and may depend on the operating margin associated with each individual emitter and receiver pair. In particular, testing the optical door sensor may comprise identifying emitter and receiver pairs having an operating margin less than or equal to the margin limit as low margin pairs. The second pattern may be defined based on the location of the or each low margin light path corresponding to the respective low margin pairs. For example, each light path may correspond to an obstacle check area, and the second pattern may comprise one or more light paths not present in the first pattern that intersect the check area associated with the or each low margin light path. The second pattern can therefore be defined to compensate for low margin emitter and receiver pairs. The second pattern may be defined by the controller and or the analysis module.

The second obstacle check procedure may have a longer time period than the first obstacle check procedure so that the response time of the optical door sensor is longer in the contingency mode than in the standard mode. It is desirable to minimise the response time of the door sensor since there is an inverse relationship between the response time and the maximum door-closing speed for safe operation of the automatic door installation. However, where the operating conditions have deteriorated to the extent that the door sensor equipment may not function reliably, it is considered to be beneficial to maintain the automatic door installation in operation at the expense of a longer response time and slower door-closing speed, rather than take the automatic door installation out of service.

Operating the automatic door installation in the contingency mode may comprise controlling a door-closing operation so that the door-closing speed is less than the door-closing speed for a door-closing operation in the standard mode. Controlling a door-closing speed may comprise controlling the energy or power delivered to a door controller. Operating the automatic door installation in the contingency mode may comprise setting the door-closing speed for a door-closing operation to less than the door-closing speed for a door-closing operation in the standard mode. For example, in the standard mode the door-closing speed may be 0.5 m/s, whereas in the contingency mode the door-closing speed may be 0.15 m/s.

The door-closing operation may be controlled so that the door-closing speed corresponds to the response time of the obstacle check according to the second obstacle check procedure (i.e. the time period for determining whether an obstacle is present in the contingency mode). For example, if the response time is doubled between the first obstacle check procedure and the second obstacle check procedure, the door-closing speed may be halved to compensate for the reduced responsiveness of the automatic door installation to the presence of an obstacle. Accordingly, the automatic door installation may be able to continue safe operation of the doors in adverse operating conditions.

The door-closing speed may be variable in the contingency mode and may be set on the basis of the operating margin of the optical door sensor.

Operating the automatic door installation in the contingency mode may comprise controlling a door-closing operation so that a limit door-closing energy is less than the limit door-closing energy for a door-closing operation in the standard mode. Operating the automatic door installation in the contingency mode may comprise setting the limit door-closing energy for a door-closing operation to less than the limit door-closing energy for a door-closing operation in the standard mode. For example, in the standard mode the limit door-closing energy may be 10 joules (approximately 7.4 foot-pounds), whereas in the contingency mode the limit door-closing energy may be 3.4 joules (2.5 foot-pounds). The energy may be set based on a regulatory code, such as the "A17" regulatory code in force in the United States of America.

Operating the door installation in the contingency mode may comprise generating an audible and/or visual warning during a door-closing operation. Accordingly, users of the automatic door installation may be more alert, which may help to avoid a user being impacted by a closing door.

The second obstacle check procedure may be configured to determine more reliably than the first obstacle check procedure whether an obstacle is present. The second obstacle check procedure may be configured to determine with a higher confidence level than the first obstacle check procedure whether an obstacle is present.

The second obstacle check procedure may have a longer response time than the first obstacle check procedure. The second obstacle check procedure may have a longer maximum response time than the first obstacle check procedure.

The automatic door installation may be an elevator installation comprising an elevator car. Operating the automatic door installation in the contingency mode may include causing the elevator car to move in an elevator car journey.

According to an aspect of the invention there is provided door sensor equipment for an automatic door installation comprising: an optical door sensor having an emitter for emitting a light signal and a receiver for detecting the light signal, the optical door sensor having at least one sensor operating parameter, and further having a baseline state in which the receiver can detect a light signal from the emitter; and a test module configured to test the optical door sensor in accordance with the first aspect of the invention.

The door sensor equipment may be configured to switch from a standard mode of operation to a contingency mode of operation when an alert is generated, wherein in the standard mode the door sensor equipment is configured to conduct an obstacle check to determine whether an obstacle is present according to a first obstacle check procedure, and wherein in the contingency mode the door sensor equipment is configured to conduct the obstacle check according to a different second obstacle check procedure.

The door sensor equipment may comprise a warning unit for generating an audible and/or visual warning during a door-closing operation. For example, the warning unit may be a sounder, or a warning light.

The door sensor equipment may be operable in accordance with a method of operating an automatic door installation described herein.

According to a further aspect of the invention there is provided an automatic door installation comprising door sensor equipment as described herein.

The automatic door installation may be an elevator installation comprising an elevator car. The elevator installation may be configured so that a door-closing operation is prevented, interrupted or reversed when it is determined that an obstacle is present. The elevator installation may be configured so that an elevator car journey can only begin after it has been determined that no obstacle is present.

According to an aspect of the invention there is provided a method of testing an optical sensor having an emitter for emitting a light signal and a receiver for detecting the light signal, the optical sensor having at least one sensor operating parameter and further having a baseline state in which the receiver can detect a light signal from the emitter, the method comprising: setting the optical sensor in an offset state in which a sensor operating parameter is offset from a baseline setting by an offset amount, the baseline setting corresponding to the baseline state of the optical sensor; conducting a signal test with the optical sensor in the offset state and generating an alert when the signal test result is negative for the offset state and the offset amount is less than or equal to a limit margin. The signal test comprises: emitting a light signal from the emitter; and determining whether the light signal is detected by the receiver. The signal test has a positive result if the light signal is detected by the receiver and a negative result if the light signal is not detected by the receiver. The limit margin may be predetermined.

The invention will now be described, by way of example, with reference to the following drawings, in which:

FIG. 1 schematically shows an elevator car of an elevator installation;

FIG. 2 schematically shows an optical door sensor;

Figure 6:
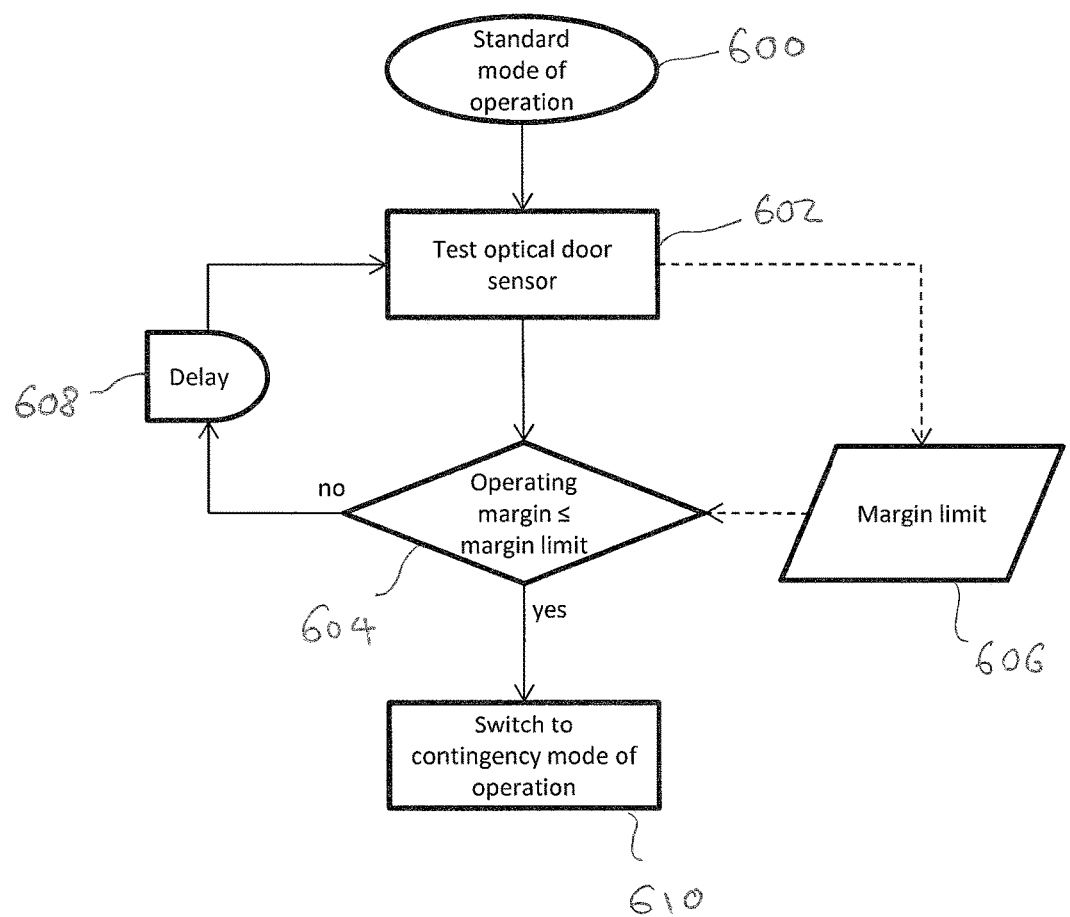
Figure 7:
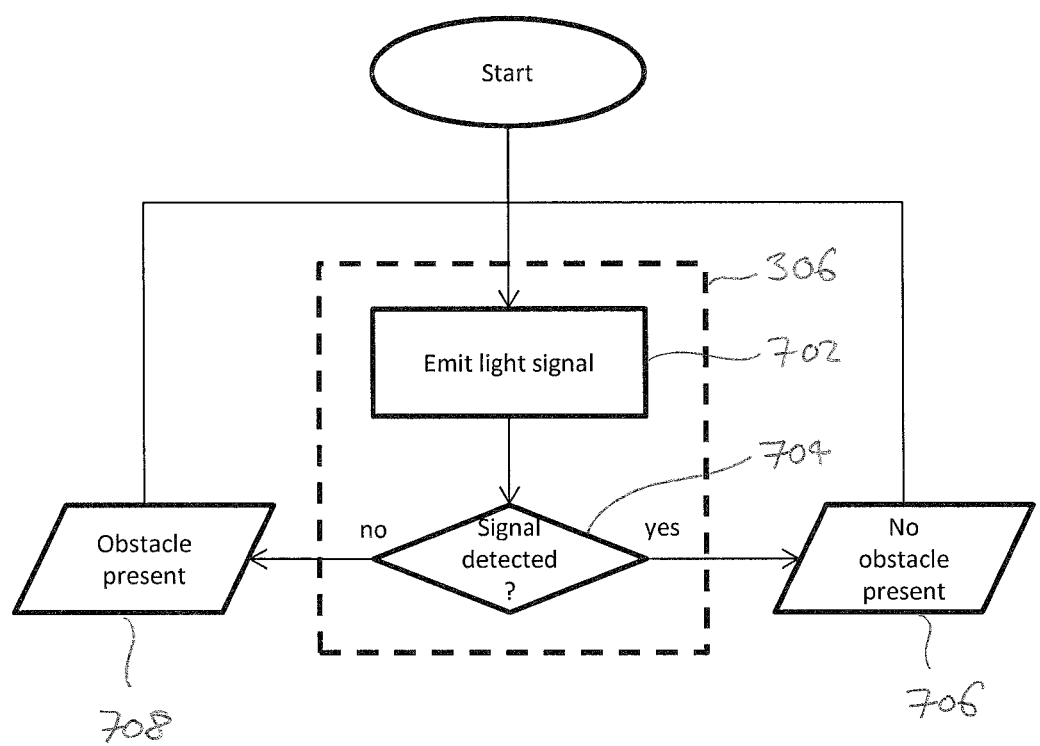

FIG. 6 schematically shows a method of operating the elevator installation;

FIG. 7 schematically shows an obstacle check in the standard mode; and

Figure 8:
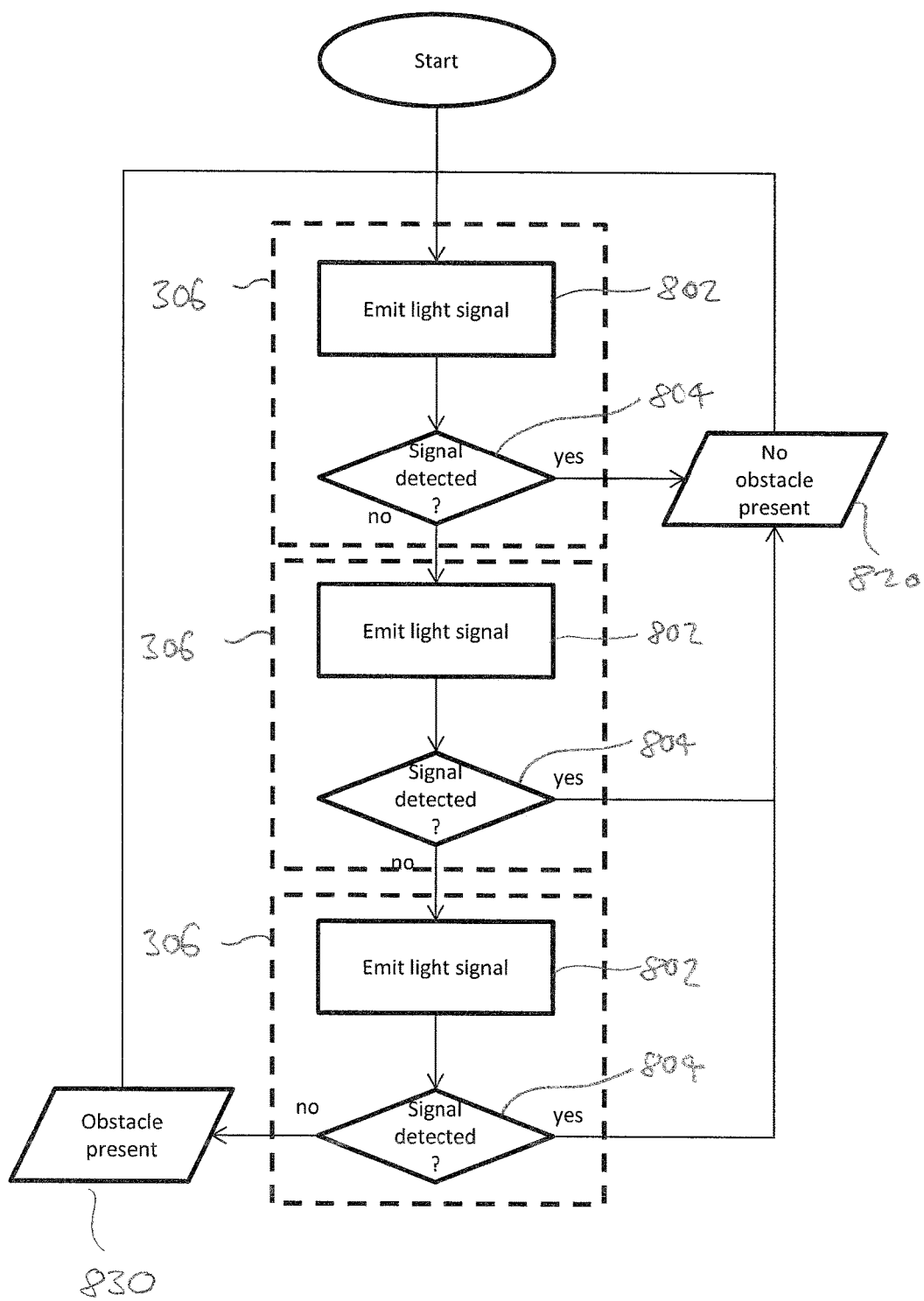

FIG. 8 schematically shows an obstacle check in the contingency mode.

Figure 1:
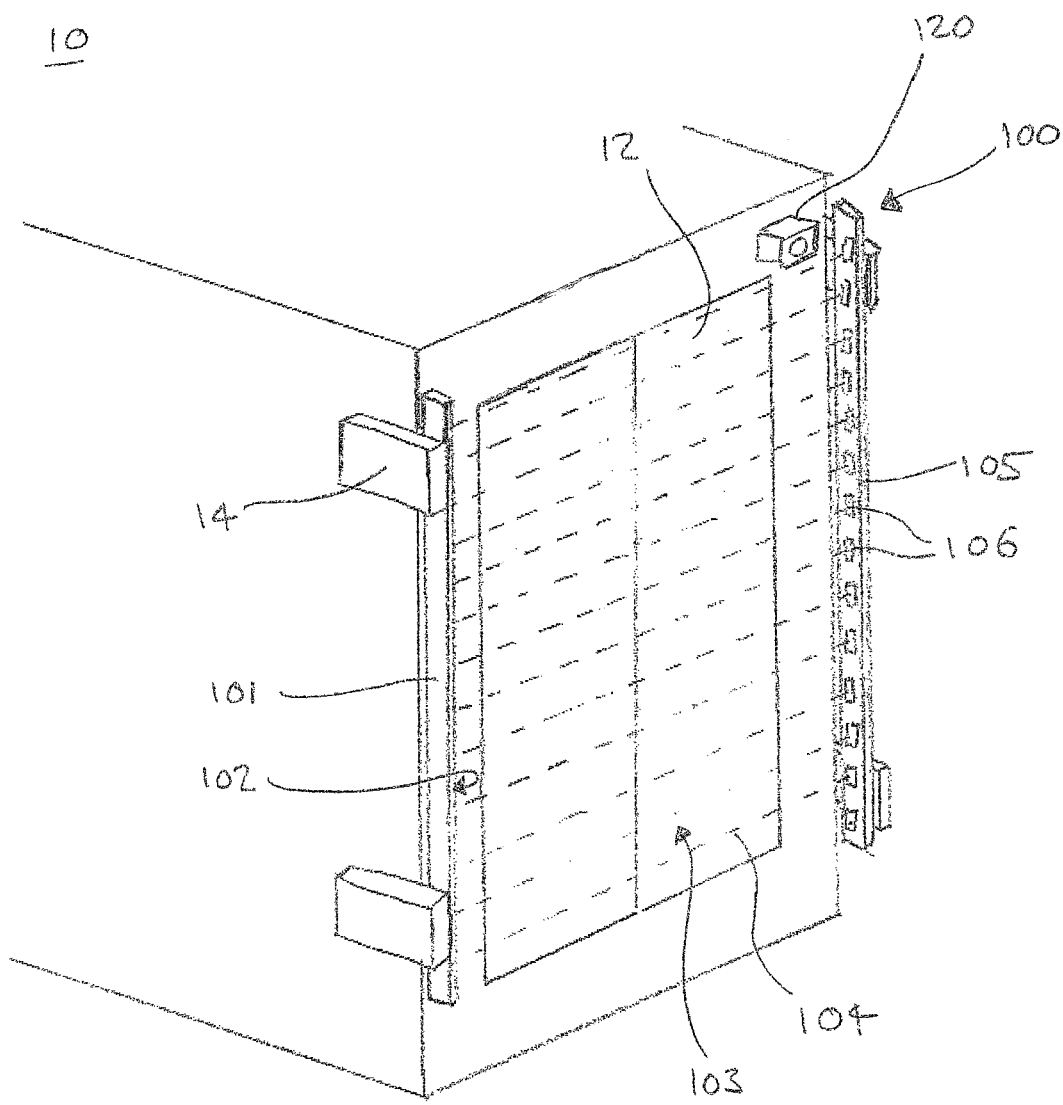

FIG. 1 shows an elevator car 10 and an optical door sensor 100 of an elevator installation. The elevator car 10 is moveable within a shaft (not shown) of the elevator installation and has a pair of automatic elevator car doors 12 that can be controlled to open and close by a controller. The elevator installation is therefore an automatic door installation.

The elevator car 10 is provided with door sensor equipment including a door sensor 100 attached to the elevator car 10 by sensor mounts 14. The door sensor 100 is configured to conduct an obstacle check to determine whether an obstacle, such as a person or object, is present in front of or between the elevator car doors.

In this particular embodiment the door sensor 100 is an optical door sensor comprising an emitter array 101 for emitting infrared light signals and a receiver array 105 for detecting the light signals. The sensor mounts 14 are arranged to hold the emitter array 101 and the receiver array 105 in the space between the elevator car 10 and the walls of the shaft. In particular, the sensor mounts 14 hold the emitter array 101 and the receiver array 105 opposite each other and aligned so that they can define a light curtain 103 between them, consisting of an array of individual infrared light signals 104 (or light beams), in the space between the elevator car doors 12 and the shaft doors installed at stop positions of the elevator installation. The emitter array 101 and the receiver array 105 each comprise a plurality of individual emitters 102 and receivers 106 respectively.

The door sensor equipment further comprises a sounder 120 for emitting an audible alert when an obstacle check determines that an obstacle is present, or other audible warning.

Figure 2:
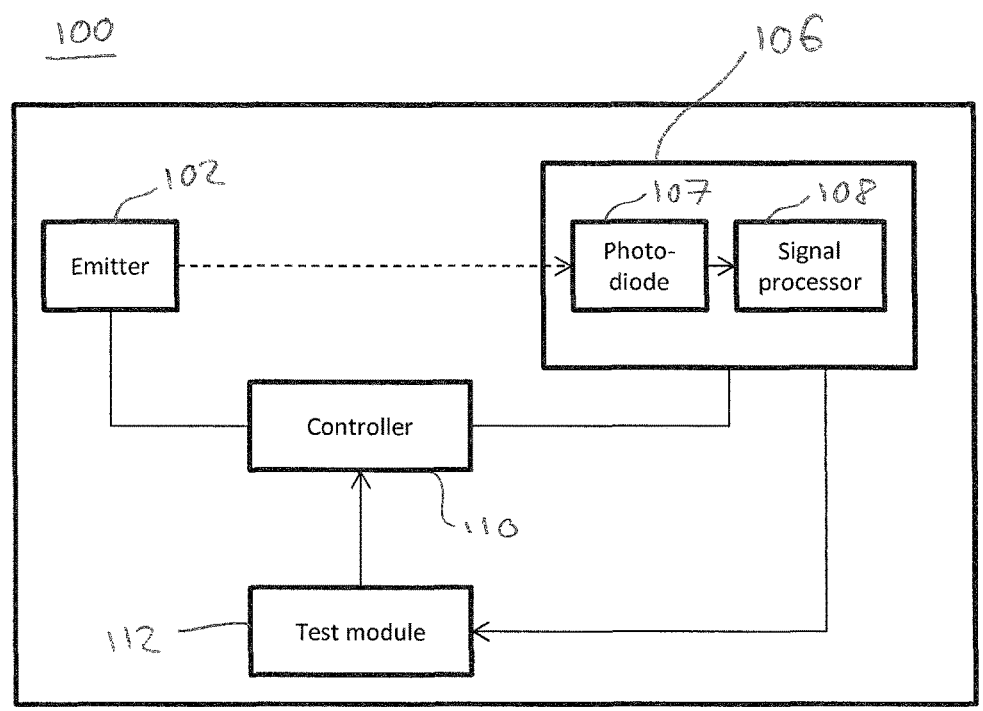

FIG. 2 shows the optical door sensor 100 including detail relating to a single emitter and receiver pair 102, 106. The receiver 106 includes a light sensor in the form of a photodiode 107 and a signal processor 108 for processing the output of the photodiode 107 and detecting the emitted light signal 104. The optical door sensor includes a controller 110 which in normal use repeatedly conducts an obstacle check to determine whether an obstacle is present. Each obstacle check comprises one or more signal tests using the emitters 102 and receivers 106 of the emitter array 101 and the receiver array 102 respectively.

The controller 110 is also configured to conduct a signal test independently of an obstacle check to determine whether emitted light signals 104 are detected by a receiver 106. In particular, the controller 110 is configured to conduct a signal test when it is known that no obstacle is present in order to test the optical door sensor 100, as will be described in detail below.

The optical door sensor 100 is considered to be in a functioning state when the receiver 106 can detect the emitted light signals 104. The functioning state relates to the ability of the receiver 106 to detect emitted light signals 104 in the absence of an obstacle between the emitter 102 and the receiver 106. Accordingly, the optical door sensor can still be in a functioning state when, in use, an obstacle is present between the emitter 102 and the receiver 106.

The optical door sensor 100 has a number of sensor operating parameters that can be adjusted to simulate deterioration of the operating conditions of the sensor, in particular the environmental operating conditions. In this embodiment, the sensor operating parameters include the light intensity for light signals from the emitter 102, and the gain ratio (i.e. the amplification) of the output of the photodiode 107 of the receiver 106. In other embodiments, the optical door sensor can have a sensor operating parameter relating to a level of noise that affects the optical door sensor. For example, the optical door sensor can include a noise signal generator for introducing a noise signal into the electronic circuitry of the optical door sensor 100.

The environmental operating conditions of the optical door sensor are those conditions which can affect the performance of the optical door sensor, but which cannot be or are not controlled. For example, the environmental operating conditions include the accumulation of material, such as dust or dirt, on the emitter 102 and/or the receiver 104, and the level of electronic noise that affects the optical door sensor. For example, electronic noise affecting the sensor may be generated by equipment sharing the power supply of the optical door sensor, or other sources of electromagnetic interference.

The optical door sensor 100 further comprises a test module 112 for testing an operating margin of the optical door sensor 100. The operating margin may relate to a level of deterioration of the operating conditions that the optical door sensor can sustain whilst remaining in the functioning state.

Figure 3:
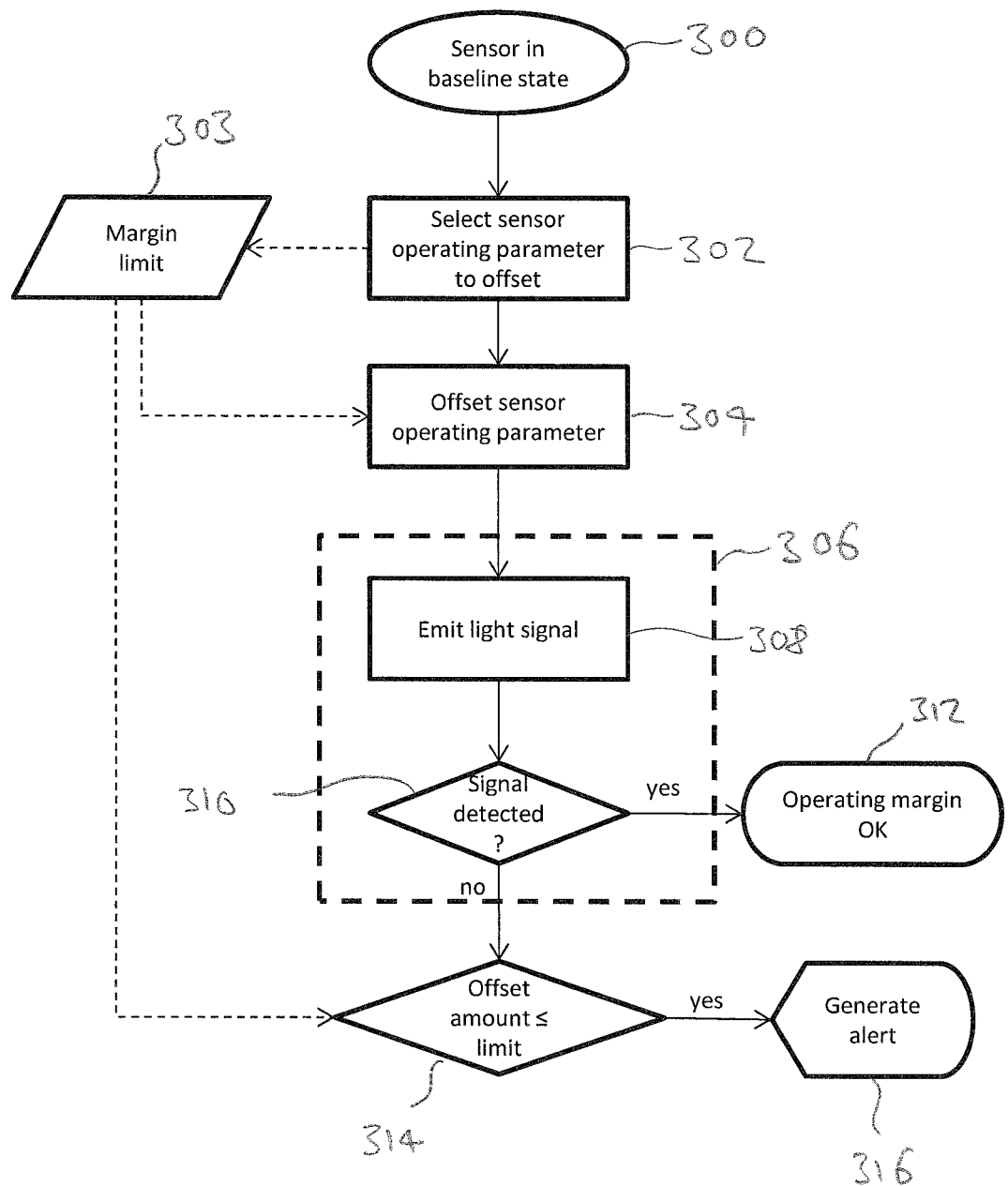
FIG. 3 shows a method of testing an operating margin of the optical sensor of FIG. 1 according to an embodiment of the invention.

FIG. 3 shows a method of testing an operating margin of the optical door sensor 100 carried out by the test module 112 according to an embodiment of the invention. In this example, it is tested whether an operating margin corresponding to the light intensity of the emitter 104 is within a predetermined limit margin of 20%. The limit margin represents the minimum desired (or acceptable) operating margin for the optical door sensor.

The optical door sensor 100 is initially in a baseline state in which the sensor operating parameters are set to baseline settings, and in which the optical door sensor is in a functioning state such that light signals 104 from the emitter can be detected by the receiver 106. In this embodiment the sensor operating parameters are adjusted by the controller 110 as percentages of the baseline settings. Accordingly, in the baseline state, each of the sensor operating parameters is 100%.

The light intensity of light signals 104 from the emitter 102 is selected (302) as the sensor operating parameter to be offset from the baseline settings. This sensor operating parameter is offset from the respective baseline setting by setting the light intensity to put the optical door sensor in an offset state (304). In this embodiment, only a single offset state of the optical door sensor 100 is to be tested, and so the light intensity is reduced by an amount corresponding to the predetermined limit margin of 20% (303). The light intensity of the emitter 104 in the offset state is therefore 80% of the baseline setting, and the offset amount is 20%.

A signal test 306 is conducted with the optical door sensor 100 in the offset state. The signal test 306 includes steps which the optical door sensor performs routinely during normal operation, i.e. emitting a light signal 104 from the emitter 102 (308) and determining whether light signal is detected by the receiver 106 (310). During normal operation of the optical door sensor 100, this is done as part of an obstacle check to determine if an obstacle is present, based on the principle that a light signal will be detected if no obstacle is present, and will not be detected if there is an obstacle present.

In contrast, in the testing method, the signal test 306 is conducted to determine whether the optical door sensor continues to function normally (i.e. remains in the functioning state) whilst in the offset state, rather than to determine whether an obstacle is present.

If the light signal 104 is detected by the receiver 106, then the optical door sensor has continued to function normally despite the reduced intensity of the light signal 104. Accordingly, it can be concluded that the operating margin (relating to the light intensity) of the optical door sensor is greater than the predetermined limit margin (312). This can indicate that the optical door sensor 100 may be tolerant to deterioration of its operating conditions in general, such as the accumulation or further accumulation of dirt or dust on the surfaces of the emitter 102 and the receiver 106, or an increase in a level of electronic noise that affects the optical door sensor 100.

If the light signal 104 is not detected by the receiver 106, the test module 112 determines whether the offset amount is less than or equal to the predetermined limit margin (314). In this embodiment, this determination is simply a confirmation, as the offset amount was originally set to the predetermined limit margin of 20%. Accordingly, an alert is generated (316). The alert is communicated from the optical door sensor to external equipment, such as a remote monitoring station, where an audible or visual alert is generated.

Figure 4:
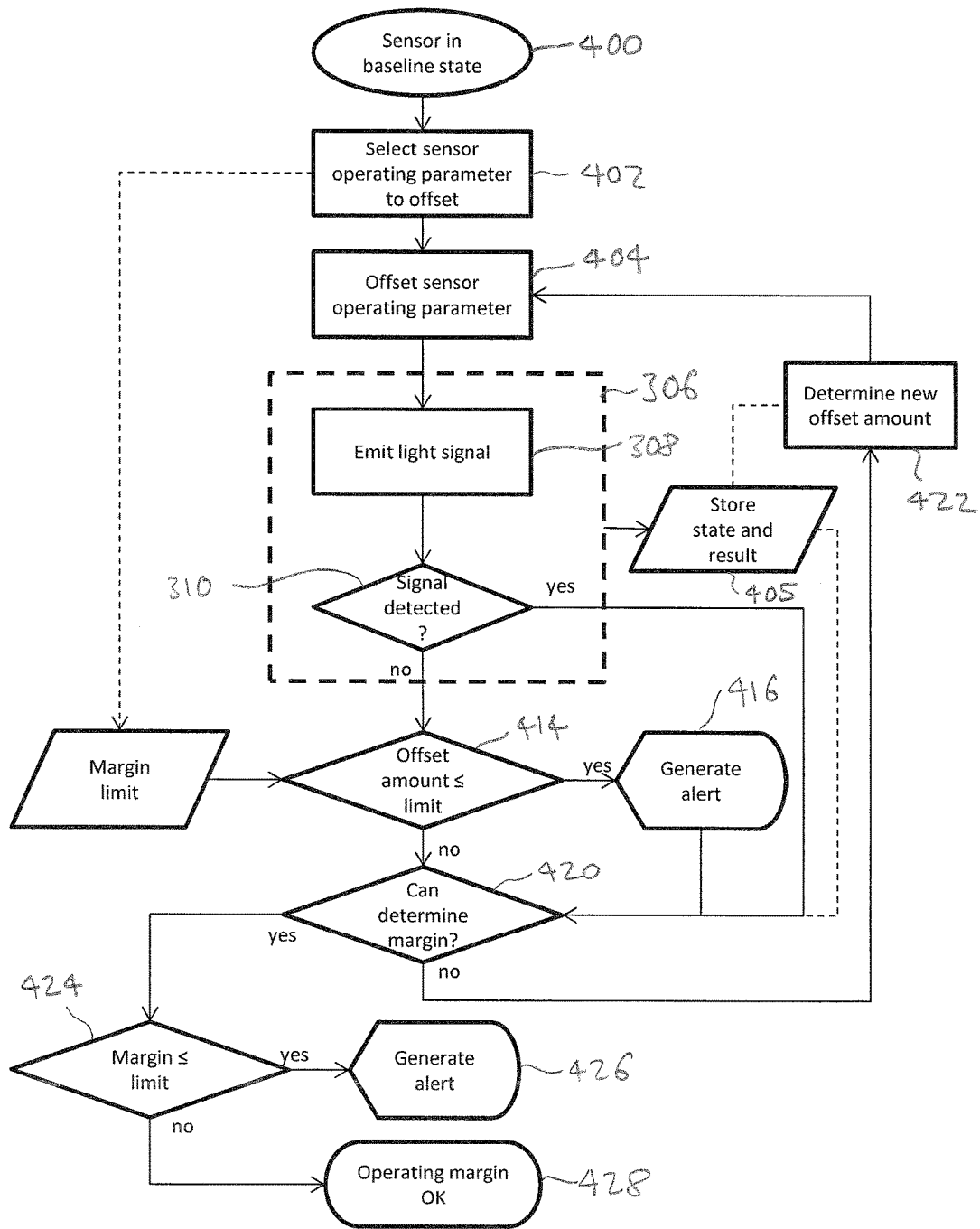
FIG. 4 shows a method of testing and determining an operating margin of an optical sensor according to an embodiment of the invention.

A method of testing an operating margin of the optical door sensor 100 and of determining the operating margin is shown in FIG. 4. In this example, the method determines a value for an operating margin, even if it is less than the predetermined limit margin.

The optical door sensor 100 is initially in a baseline state (400), as described above. The gain ratio of the output of the photodiode 107 is selected as the sensor operating parameter to be offset from the baseline settings (402). Again, the sensor operating parameter is set by the controller 110 as a percentage of the baseline setting for the parameter (gain ratio). The predetermined limit margin for the gain ratio is 80% of the baseline setting (403).

In this embodiment, the gain ratio is progressively reduced from the baseline setting to define a number of different offset states, each of which are evaluated until the optical door sensor 100 ceases to function normally (i.e. until it is determined that an emitted light signal 104 is not detected by the receiver 106).

The offset amount for the gain ratio is initially 1% so that the gain ratio in the initial offset state is offset to 99% of the baseline setting (404). A signal test 306 is conducted with the optical door sensor 100 in the offset state. The signal test 306 comprises emitting a light signal 104 from the emitter 102 (308), and determining whether the emitted signal is detected by the receiver 106 (310), as described above. In addition, the result of the signal test and the sensor operating parameters for the offset state are correlated and stored in memory for subsequent re-use (405).

If the light signal 104 is detected by the receiver 106, the test module 112 assesses whether it has sufficient information to determine the operating margin (420), for example, by interrogating the stored correlated results (405) for previous offset states. The test module 112 requires at least the following information to determine the operating margin: an offset amount corresponding to a positive signal test result (which can include an offset amount of 0% for the baseline setting), and an offset amount corresponding to a negative signal test result. In this example, the signal test result is positive for an offset amount of 1%, and so there is not yet sufficient information to determine the operating margin. The case in which the light signal 104 is not detected is described later in the following description.

Since there is not sufficient information to determine the operating margin, the test module 112 determines a new offset amount for the gain ratio (422). In this example, the test module 112 is configured to progressively increase the offset amount in increments of 1% to simulate deterioration of the operating conditions in the optical door sensor 100. The optical door sensor is therefore set in a new offset state in which the gain ratio is offset from the baseline gain ratio by 2% (404), and the signal test is repeated (306). In other embodiments, the new offset amount may be based on the stored correlated offset amounts and signal test results for previous signal tests (405)

The method continues in this loop until a negative signal test result occurs. In this example, the first negative signal test result occurs when the offset amount is 13% (i.e. when the gain ratio is set at 87% of the baseline setting).

Following the negative signal test result, the test module 112 determines whether the offset amount is less than or equal to the predetermined limit margin (403), as described above). In this example, the offset amount (13%) is clearly less than the predetermined limit margin (87%), and so an alert is generated (416). As in the previous embodiment, the alert is communicated from the optical door sensor to external equipment, such as a remote monitoring station, where an audible or visual alert is generated.

The method continues to determine the operating margin itself. As described above, the testing module 112 assesses whether it has sufficient information to determine the operating margin (420). Correlated results for both positive and negative signal test results are now stored in memory (405), and so there is sufficient information.

In this embodiment, the testing module 112 is configured to determine the operating margin to within 1%. Since the memory 405 will contain results for an offset amount of 12% correlated to a positive signal test result, and an offset amount of 13% correlated to a negative signal test result, it can therefore determine the operating margin to be between 12% and 13%, which is within the required accuracy. In other embodiments, the test module 112 may be configured to define and test further offset states until the operating margin can be determined within a required accuracy, for instance using a bisection method.

The operating margin is therefore determined to be approximately 12.5%, based on mid-point between the greatest offset amount corresponding to a positive signal test result and the lowest (and only) offset amount corresponding to a negative signal test result. The operating margin is also determined to be less than the predetermined limit margin (424), and so the test module generates a further alert indicating this (426).

In an alternative example in which the above method is carried out for a different optical door sensor, the operating margin may be determined to be greater than the predetermined limit margin, for example it may be 23%. In such an example, it may therefore be concluded and reported to a remote monitoring station that the operating margin (based on the selected sensor operating parameter) is acceptable without an alert being generated.

Figure 5:
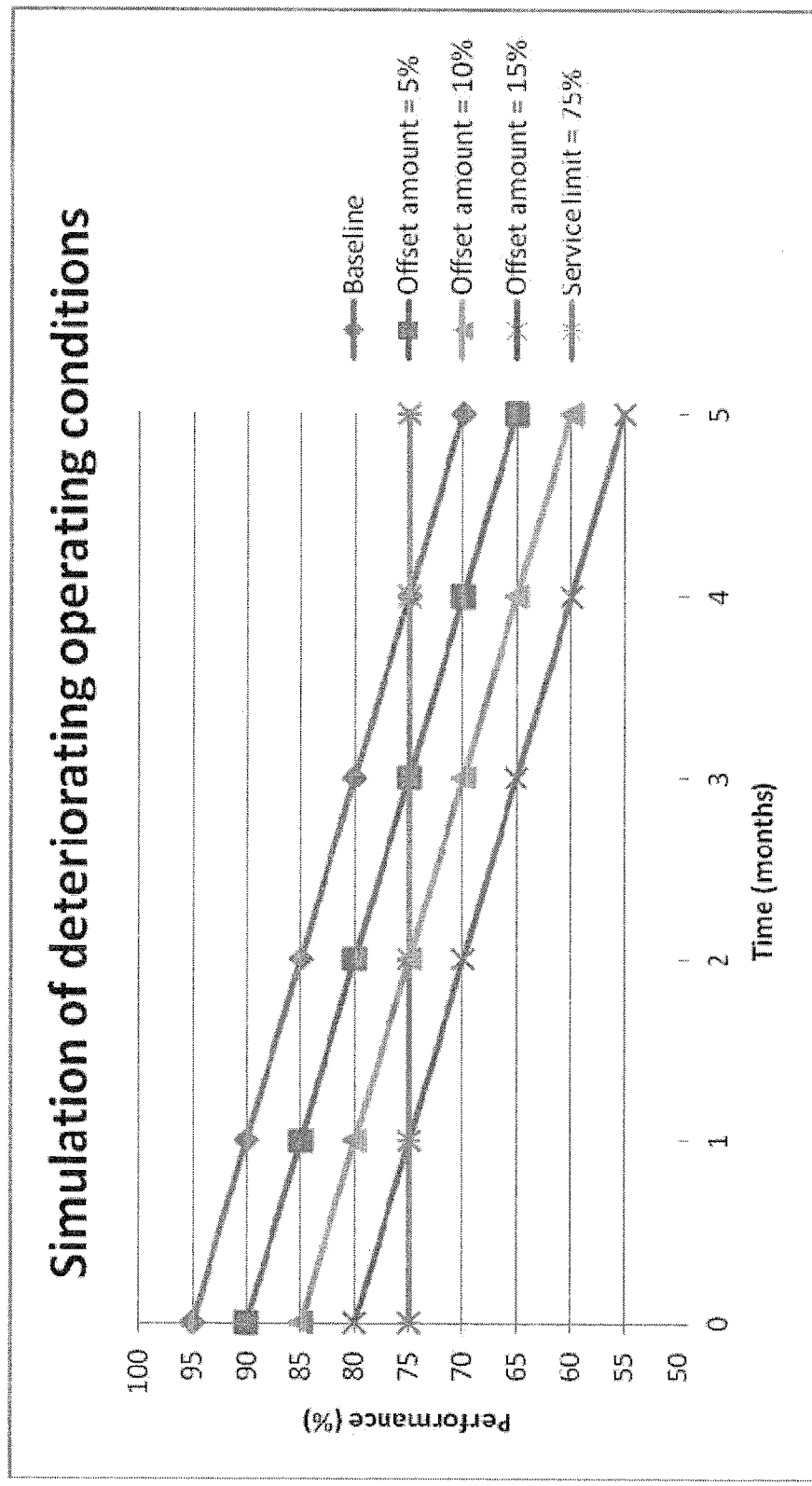
FIG. 5 shows a plot illustrative of deterioration of the operating conditions of an optical sensor.

An illustrative example of the tolerance of the optical door sensor is shown in FIG. 5, which is a plot showing in general terms the deterioration in the performance of the optical door sensor 100 over time, assuming that dirt or dust accumulates on the surfaces of the optical door sensor 100 at a constant rate, and thereby degrades the performance of the sensor at a constant rate. The performance is shown in relation to optimum operating conditions in which the sensor operating parameters are at baseline settings, and the environmental operating conditions are favourable (i.e. no accumulated dust or dirt on the optical door sensor 100, and no significant electronic noise affecting the sensor). The plot is a generalisation in that it assumes that deterioration of all operating conditions (both the sensor operating parameters and environmental operating conditions) have the same linear effect on the performance of the optical door sensor.

The plot shows a service limit for the optical door sensor 100 of 75% of optimum operating conditions. This means that the optical door sensor 100 will fail to detect an emitted light signal at 75% of optimum operating conditions.

As shown in the plot, at zero months, the baseline state of the sensor is only 95%, meaning that the real operating conditions results in a 5% reduction in the performance of the sensor relative to optimum conditions. This could be due to an amount of material already accumulated on the sensor 100. The baseline state of the sensor is shown to deteriorate over time as more material builds up on the sensor to occlude the light signals. Operating with the baseline settings, the sensor will reach the service limit of performance after 4 months, at which point it will cease functioning normally.

The plot also shows the results of testing the operating margin of the optical door sensor over time, using three different offset states corresponding to a 5%, 10% and 15% offset in a sensor operating parameter, such as the light intensity of the emitter 104. Initially, each test would result in a positive signal test result. After 1 month, a test using an offset state of the sensor corresponding to an offset amount of 15% would result in a negative signal test result. In contrast, a test using an offset amount of 5% would not result in a negative signal test result until 3 months have passed. Setting the predetermined limit margin to values of either 5%, 10% and 15% would therefore result in alerts being generated 1 month, 2 months and 3 months before failure of the optical door sensor respectively.

Accordingly, it can be seen that testing the operating margin according to the above described methods can allow a failure of the optical door sensor to be avoided.

The operating margins of optical sensors installed in a number of different applications can be tested according to the above described methods. One example is an optical door sensor of an automatic door installation. A further example is an optical door sensor for an elevator car of a lift installation.

In addition, the outcome of the test can be used to change the operation of an automatic door installation. For example, in one embodiment a cleaning operation may be automatically initiated based on the test method (i.e. when an alert is generated indicating that the operating margin is less than or equal to the margin limit).

In a further embodiment of the invention described in detail below, the test module is configured to test the optical door sensor and adjust how the associated automatic door installation operates based on the output of the test.

The door sensor equipment is installed in an elevator installation and has a standard mode and a contingency mode of operation, and the controller 110 is configured to change between the standard mode and the contingency mode when it is determined that the operating margin of the optical door sensor is less than or equal to a predetermined margin limit (i.e. the signal test result is negative for the offset state and the offset amount is less than or equal to a limit margin). In particular, the controller 110 is configured to conduct the obstacle check to determine whether an obstacle is present according to a first obstacle check procedure when operating in the standard mode, and to conduct the obstacle check according to a different second obstacle check procedure when operating in the contingency mode.

The second obstacle check procedure is configured so that the presence or absence of an obstacle can be more reliably determined than the first obstacle check procedure, in view of the deterioration in the operating condition or conditions of the elevator installation.

As shown in FIG. 6, under normal operating conditions the elevator installation operates in the standard mode (600) in which the door sensor equipment conducts the obstacle check according to the first obstacle check procedure. The test module 112 tests the optical door sensor 100 as described above (602) and determines whether the operating margin is less than or equal to the predetermined margin limit (604, 606). If it is determined that the operating margin is greater than the predetermined margin limit then the elevator installation continues to be operated in the standard mode (600). After a delay (608), the optical door sensor 100 is tested again, and the above described process will continue in a loop. If it is determined that the operating margin of the optical door sensor is less than or equal to the predetermined margin limit, the test module 112 switches to a contingency mode of operation for the elevator installation (610). In the contingency mode, the door sensor equipment conducts the routine obstacle check according to the second obstacle check procedure.

As shown in FIG. 7, in this embodiment, the obstacle check according to the first obstacle check procedure comprises a single signal test (306) for each emitter-receiver pair of the optical door sensor 100. The emitter 102 emits a first light signal in the standard mode (702) which comprises 2000 25-microsecond flashes of infrared light separated by 25-microsecond intervals in an active signal portion of 100 milliseconds duration, followed by a 100-millisecond inactive signal portion in which no infrared light is emitted. The 25-microsecond flashes correspond to a carrier frequency of the light signal of 40 kHz. The receiver 106 is configured to detect this light signal 104 in the standard mode (704). If it is determined that the light signal 104 is detected by the receiver, then it can be concluded (706) that there is no obstacle present between the emitter 102 and the receiver 106. In contrast, if the light signal 104 is not detected by the receiver, then it can be concluded (708) that there is an obstacle present between the emitter 102 and the receiver.

In the contingency mode of operation, the obstacle check is conducted according to the second obstacle check procedure, which is defined so as to improve the reliability of the door sensor equipment in determining the presence or absence of an obstacle.

As shown in FIG. 8, in the second obstacle check procedure three signals tests are conducted so that the receiver 106 has up to three chances to detect the light signal. Accordingly, the second obstacle check allows the receiver 106 to fail to detect a light signal from the emitter 102 up to twice, without it being wrongly determined that an obstacle is present. In the second obstacle check procedure, a first instance of the light signal is emitted (802) in a first signal test (306), as in the standard mode of operation. If it is determined (804) that the light signal 104 is detected by the receiver 106, then it can be concluded that no obstacle is present (820). If not, a second instance of the light signal is emitted (802) as part of a second signal test (306) in the same obstacle check procedure. Again, if it is determined (804) that the light signal 104 is detected by the receiver 106, then it can be concluded that no obstacle is present (820). If not, a third instance of the light signal is emitted (802) as part of a third signal test (306) in the same obstacle check procedure. Again, if it is determined (804) that the light signal 104 is detected by the receiver 106, then it can be concluded that no obstacle is present (820). However, if the light signal 104 is not detected, then it is finally determined that an obstacle is present (830).

In other embodiments, the second obstacle check procedure may always comprise a predetermined number of signal tests, and the obstacle check may determine that no obstacle is present if at least one of the light signals is detected.

As a consequence of repeating the signal test up to three times before determining whether an obstacle is present or not, the signal response time is increased in the second obstacle check procedure. However, an increase in the signal response time is an acceptable penalty to prevent the elevator installation from being taken out of service.

Accordingly, in the contingency mode of operation, any door-closing operation is controlled so that the door-closing speed is less than the door-closing speed for a door-closing operation in the standard mode to compensate for the increased response time of the door sensor.

In this embodiment, the door-closing speed is controlled by limiting a door-closing energy of the elevator doors. In particular, the drive energy is limited to 10 joules in the standard mode of operation and is limited to 3.4 joules in the contingency mode.

In addition to repeating the signal test more than once, a number of properties of the obstacle check are adjusted in the second obstacle check procedure to differ from the first obstacle check procedure.

In this embodiment, the second obstacle check procedure comprises emitting light signals having an active signal portion of 150 milliseconds followed by an inactive signal portion of 150 milliseconds. Accordingly, light signals are longer in duration in the second obstacle check procedure than in the first obstacle check procedure by a total of 100 milliseconds, which means that the response time of the sensor (i.e. the time taken for the receiver 106 to detect the light signal) is also longer.

Further, the carrier frequency of the light signal 104 changes during the active signal portion by frequency hopping so as to mitigate the effect of any excessive noise. In this example, the carrier frequency is 40 kHz, 36 kHz and 38 kHz for first, second and third approximately equal sections of the active signal portions of the signal respectively. The receiver 106 is configured to detect the light signal at the different carrier frequencies as it changes between them. In other embodiments, the phase of the light signal may be adjusted to avoid noise signals of a similar frequency. In embodiments where the light signal is encoded, the data format may be adjusted (e.g. the data modulation format).

Further, the intensity of the light signals is higher in the second obstacle check procedure than the first obstacle check procedure to improve the probability that light signals are detected.

In this embodiment, the elevator installation only reverts to the standard mode upon manual instruction, so that the source of electronic noise must always be investigated and resolved for normal operation to resume. However, in other embodiments, the elevator installation may be configured to revert to the standard mode of operation if it is determined that the operating margin is greater than the margin limit.

It will be appreciated that the term "light" means electromagnetic radiation including both visible light and non-visible light such as infrared and ultraviolet light.

Embodiments of an optical door sensor have been described in which there is an emitter array having a plurality of emitters and a receiver array having a plurality of receivers. It will be appreciated that the optical door sensor or a door controller may be configured so that an obstacle is determined to be present only when a minimum number of receivers, greater than one, fail to detect a light signal from respective emitters. In other words, a limited number of receivers may be able to fail to detect a light signal without causing the optical door sensor to operate as if the presence of an obstacle has been determined. Accordingly, a signal test for the optical door sensor may comprise emitting light signals from the plurality of emitters, and determining if a predetermined minimum number of receivers detect the light signals.

The invention claimed is:

1. A method of testing an optical door sensor having an emitter for emitting a light signal and a receiver for detecting the light signal, the optical door sensor having at least one sensor operating parameter and further having a baseline state in which the receiver can detect a light signal from the emitter, the method comprising:
   a test module of the optical door sensor successively setting the optical door sensor in a plurality of offset states in which a sensor operating parameter is offset from a baseline setting by an offset amount, the baseline setting corresponding to the baseline state of the optical door sensor and the plurality offset states comprising at least one offset state in which a sensor operating parameter is offset by a first offset amount, and at least one offset state in which the same sensor operating parameter is offset by a different second offset amount;
   the test module conducting a signal test for each of the plurality of offset states, with the optical door sensor in the offset state, the signal test comprising:
   the test module causing a light signal to be emitted from the emitter; and
   determining, by the test module, whether the light signal is detected by the receiver;
   the signal test having a positive result if the light signal is detected by the receiver and a negative result if the light signal is not detected by the receiver; and
   the test module generating an alert when the signal test result is negative for the offset state and the offset amount is less than or equal to a limit margin.

2. A method according to claim 1, wherein the plurality of offset states comprises at least one offset state in which the sensor operating parameter is a first sensor operating parameter, and at least one offset state in which the sensor operating parameter is a different second sensor operating parameter.

3. A method according to claim 1, wherein the sensor operating parameter is progressively offset for a plurality of successive offset states.

4. A method according to claim 1, wherein signal tests are conducted for successive offset states until a signal test has a negative result.

5. A method according to claim 1, comprising determining an operating margin of the optical door sensor relating to the tolerance of the optical door sensor to deterioration of the operating conditions of the optical door sensor.

6. A method according to claim 1, comprising determining an operating margin of the optical door sensor based on a minimum offset amount for the sensor operating parameter that corresponds to a negative signal test result and/or a maximum offset amount for the sensor operating parameter corresponding to a positive signal test result.

7. A method according to claim 5, further comprising reporting the operating margin to a remote monitoring station.

8. A method according to claim 5, further comprising generating an alert when the operating margin is determined to be less than or equal to a limit margin.

9. A method according to claim 1, wherein the sensor operating parameter relates to the intensity of the light signal from the emitter, the sensitivity of the receiver, or the electronic noise intensity in the circuitry of the optical door sensor.

10. A method according to claim 1, wherein the optical door sensor comprises a plurality of emitters and a plurality of receivers.

11. A method according to claim 1, wherein the optical door sensor is an optical door sensor for an automatic door installation, such as an elevator installation.

12. A method according to claim 11, further comprising initiating a cleaning operation to clean the optical door sensor.

13. Door sensor equipment for an automatic door installation comprising:
   an optical door sensor having an emitter for emitting a light signal and a receiver for detecting the light signal, the optical door sensor having at least one sensor operating parameter, and further having a baseline state in which the receiver can detect a light signal from the emitter; and
   a test module configured to test the optical door sensor by a method in accordance with claim 1.

14. A method of testing an optical door sensor of an elevator installation, the optical door sensor having an emitter for emitting a light signal and a receiver for detecting the light signal, the optical door sensor having at least one sensor operating parameter and further having a baseline state in which the receiver can detect a light signal from the emitter, the method comprising:
   a test module of the optical door sensor successsively setting the optical door sensor in a plurality of offset states in which a sensor operating parameter is offset from a baseline setting by an offset amount, the baseline setting corresponding to the baseline state of the optical door sensor and the plurality of offset states comprising at least one offset state in which a sensor operating parameter is offset by a first offset amount, and at least on offset state in which the same sensor operating parameter is offset by a different second offset amount;

the test module conducting a signal test for each of the plurality of offset states, with the optical door sensor in the offset state, the signal test comprising:

the test module causing a light signal to be emitted from the emitter; and the test module determining whether the light signal is detected by the receiver;

the signal test having a positive result if the light signal is detected by the receiver and a negative result if the light signal is not detected by the receiver; and the test module generating an alert when the signal test result is negative for the offset state and the offset amount is less than or equal to a limit margin;

wherein the sensor operating parameter relates to the intensity of the light signal from the emitter, the sensitivity of the receiver, or the electronic noise intensity in the circuitry of the optical door sensor; and wherein the method comprises the test module successively setting the optical door sensor in a plurality of different offset states; wherein a signal test is conducted for each of the plurality of offset states until a signal test has a negative result.

* * * * *